(12) United States Patent
Bartling

(10) Patent No.: US 6,938,935 B2
(45) Date of Patent: Sep. 6, 2005

(54) METERING DEVICE FOR SAND SPREADING DEVICES, ESPECIALLY FOR RAIL VEHICLES

(75) Inventor: Werner Bartling, Elze (DE)

(73) Assignees: Norbert Goldmann, Elze (DE); Luise Bartling ( * ) Notice: Subject to any disclaimer, the term of this patent is extended or adjusted under 35 U.S.C. 154(b) by 0 days.

(21) Appl. No.: 10/793,668

(22) Filed: Mar. 3, 2004

(65) Prior Publication Data

US 2005/0001434 A1 Jan. 6, 2005

Related U.S. Application Data

(63) Continuation of application No. PCT/EP02/10412, filed on Sep. 17, 2002.

(51) Int. Cl.$^7$ .................................................. B67D 3/00
(52) U.S. Cl. ............................ 291/1; 222/518; 222/509; 222/559; 222/561
(58) Field of Search ................................. 291/6, 41, 46, 291/16, 1, 28, 34, 36, 29, 31, 30; 222/509, 507, 518, 528, 540, 547, 559, 561

(56) References Cited

U.S. PATENT DOCUMENTS

| 528,998 | A | * | 11/1894 | Thomas | 291/36 |
| 769,929 | A | * | 9/1904 | Allenbach | 291/34 |
| 772,218 | A | * | 10/1904 | Cooper | 291/36 |
| 872,104 | A | * | 11/1907 | Bacon | 291/20 |
| 2,334,181 | A | * | 11/1943 | Elston | 291/23 |
| 2,522,677 | A | * | 9/1950 | Kelly | 291/36 |

* cited by examiner

Primary Examiner—Mark T. Le
(74) Attorney, Agent, or Firm—Martin Fleit; Paul D. Bianco; Fleit Kain Gibbons Gutman Bongini & Bianco P.L.

(57) ABSTRACT

Metering or dosing device for sand spreading apparatuses with a metering piston for sealing off and releasing the throughflow opening for the material to be spread, in which the metering piston and the opposite housing wall of the passage hole have profiles overlapping each other so that a labyrinth-like outflow of the spread material results.

7 Claims, 3 Drawing Sheets

METERING DEVICE FOR SAND SPREADING DEVICES, ESPECIALLY FOR RAIL VEHICLES

RELATED APPLICATIONS

The application is a continuation of International Application No. PCT/EP02/10412 filed Sep. 17, 2002, the contents of which are here incorporated by reference in their entirety.

BACKGROUND OF THE INVENTION

1. Field of the Invention

The invention concerns a metering or dosing device for sand spreading apparatuses, especially for rail vehicles for spreading sand between wheel and rail.

2. Prior Art

In known sand-scattering apparatuses of this type the sand flows from the supply tank for the sand to the wheel through a housing with a throughflow borehole, wherein the amount of throughflow or the throughflow jet for the sand is controlled by a metering piston that is controlled electrically, pneumatically or in another manner and regulates the throughflow opening from 0 to a prescribed value. When the metering piston is closed, it sits with an end seal on the edge of the opening of the throughflow borehole and opens it when the piston is drawn back. The opening gap is preadjusted as a function of the coarseness of the sand used to avoid bridgings on the required minimum gap and thus also obligatorily predetermines a random amount of sand in connection with the annular opening gap. However, this system was not completely satisfactory for certain sand demands, especially pneumatic sand demands because the sand quantities are adjustable only in relatively large tolerances so that defined small amounts of sand are attainable only unsatisfactorily with the known system in certain cases.

SUMMARY OF THE INVENTION

The problem of the present invention is to find measures by which a supplying of small sand amounts is also adjustable.

This problem is solved in that a labyrinth-like section is provided in the throughflow or passage hole according to the invention.

According to another feature of the invention, the labyrinth-like section runs crosswise to the direction of throughflow.

According to another feature of the invention, the labyrinth-like section is developed by a profile on the sealing surface of the metering piston and/or the opposite wall of the sand passage opening.

According to another feature of the invention, there is an overlapping between the housing and sealing profile in the arrangement of the sealing profile on both the housing and the metering piston at a maximum metering piston opening stroke.

BRIEF DESCRIPTION OF THE DRAWINGS

Additional features of the invention are elucidated in more detail with reference to the drawings, in which.

DETAILED DESCRIPTION OF PREFERRED EMBODIMENTS OF THE INVENTION

Figure 1:
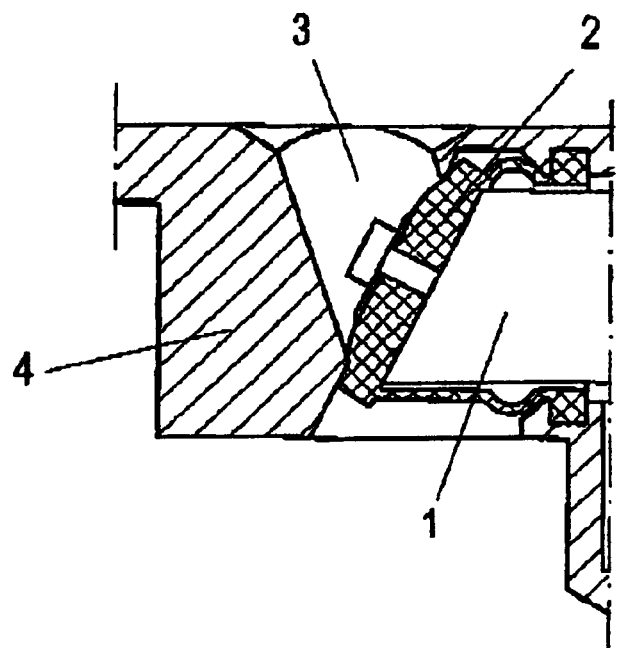
FIGS. 1 and 2 show the known metering piston sealing system with closed and open metering piston.
Figure 2:
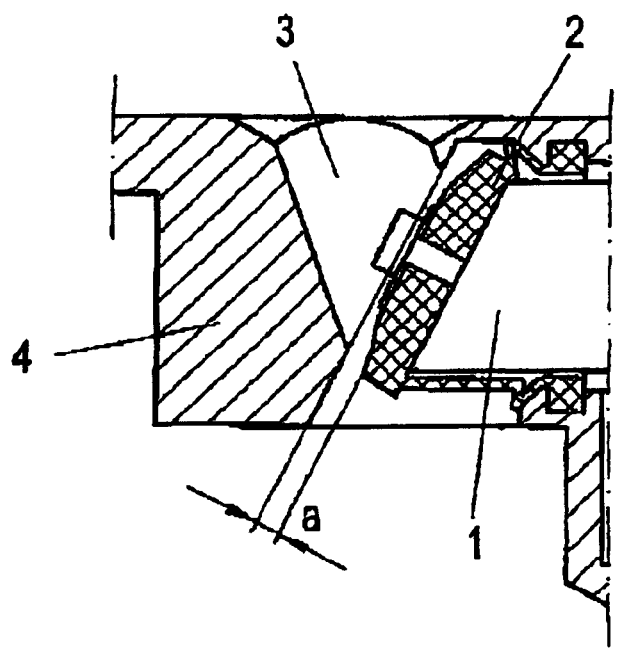
Figure 3:
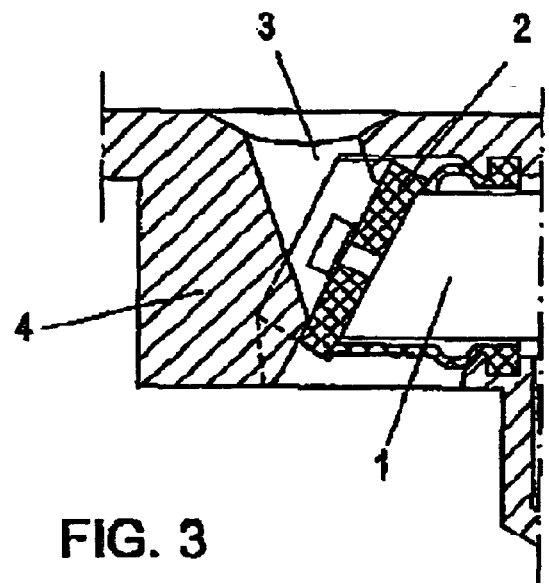
FIGS. 3 and 4 show the metering piston sealing system according to the invention in two cross sections perpendicular to each other with a closed metering piston.
Figure 4:
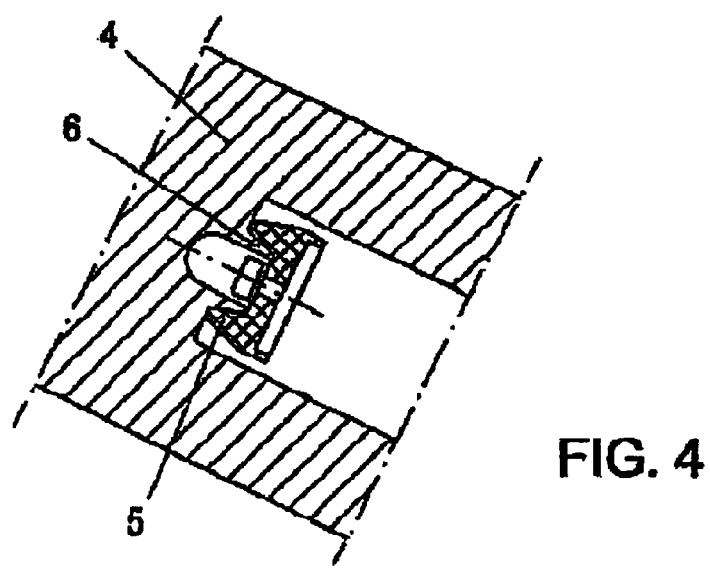

In FIGS. 1 and 2, the metering piston is denoted with 1, the metering piston seal with 2, the sand passage hole with 3 and the housing in which the sand passage hole 3 is located, with 4. When the metering piston is closed, the metering piston seal 2 is seated on the outflow edge of the passage hole 3. If the metering piston 1 gets into the open position shown in FIG. 2, an annular opening gap a with an annular throughflow channel is formed.

Figure 5:
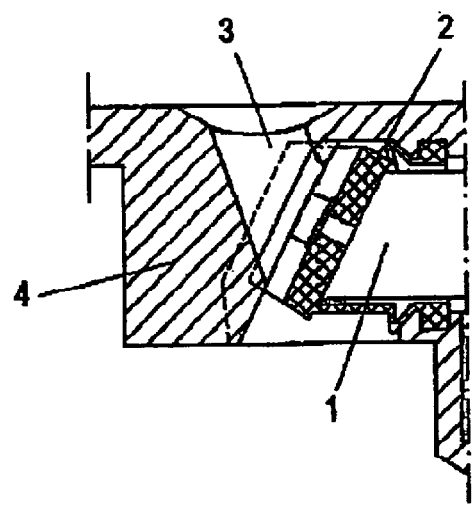
FIGS. 5 and 6 show it with an open metering piston.
Figure 6:
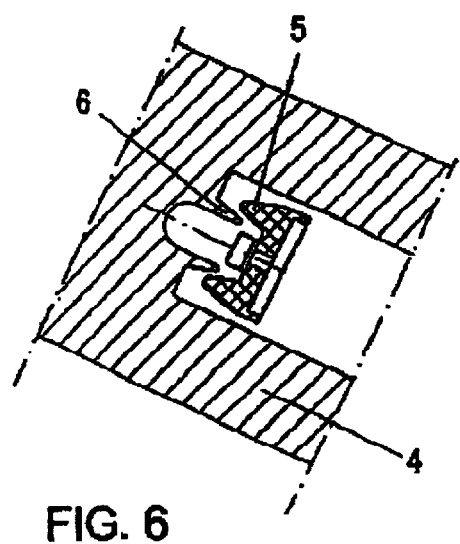
Figure 7:
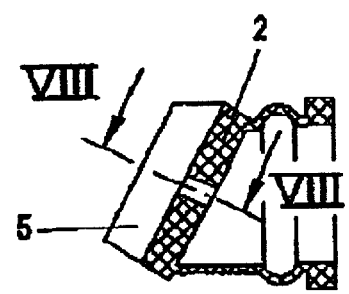
FIGS. 7 and 8, respectively, show a vertical section through the metering piston and a section along line VIII—VIII of FIG. 7.
Figure 8:
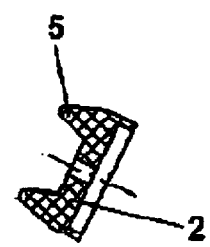

In the metering piston according to the invention according to FIGS. 4–8, the metering piston seal 2 is provided with a projecting profile 5 that is opposite a corresponding profile 6 on the housing wall 4, wherein the profile 5 of the metering piston seal 2 encloses the profile 6 of the housing 4 and the two profiles form an adequate overlapping even with an open metering piston according to FIGS. 5 and 6 and result in a labyrinth-like sand outflow opening 7.

With the sand passage opening according to the invention, the opening originally designed as a hole in the housing of the metering and shut-off opening is modified into a slit-like cross section, by which the advantage is obtained that the sand discharge opening that forms in the lower sand discharge zone is modified uniformly linearly in the surface as a function of the opening stroke of the metering piston.

The slit width of the sand passage opening in the housing of the metering and shut-off device is reduced to a minimum relative to a minimum amount of sand and the slit length is adapted relative to a maximum amount of sand so that a secure sand discharge is obtained in said quantitative tolerances with the grades of sand considered typical.

The slit width in connection with the adjusted opening stroke of the metering piston (distance from the metering piston sealing surface to the housing sealing surface) determines the effective sand discharge opening. It also essentially defines the suction surface in connection with the injector action.

A classic form of the profile can be annular with a triangular cross section running outward essentially to a point. However, any other profile design, whether as a uniform or interrupted ring, is possible.

A continuously adjustable amount of sand as with a linearly moved slide valve is possible with the metering device according to the invention, without the wear and energy expenditure occurring in a slide valve.

Although the invention has been described in terms of preferred embodiments, nevertheless changes and modification will be apparent to those skilled in the art from the teachings herein. Such changes and modification that do not depart from the spirit, scope and teachings herein are deemed to fall with the purview of the invention a claimed.

What is claimed is:

1. A metering device in a sand spreading apparatus on a rail vehicle, for applying a spread material between a wheel and a rail, comprising a displaceable metering piston for regulating a sand passage opening in said metering device, the piston having a sealing surface configured with a projecting peripheral profile, the sand passage opening being delimited by at least a wall provided with a sealing profile, the projecting peripheral profile receiving the sealing profile when the piston is in a closing position, and the profiles defining a labyrinth-shape passageway when the piston is in an open position.

2. A metering device according to claim 1, wherein the labyrinth-shape passageway runs crosswise to the direction of a throughflow.

3. A metering device according to claim 2, wherein the labyrinth-shape passageway is defined in part by a surface on said sealing surface.

4. A metering device according to claim 1, wherein there is an overlap between said profiles during an opening stroke of the metering piston.

5. A metering device according to claim 3, wherein there is an overlap between said profiles at a maximum opening stroke of the metering piston.

6. A metering device according to claim 1, wherein the projecting peripheral profile is triangular in cross-section.

7. A metering device according to claim 1, wherein the projecting peripheral profile is interrupted.

* * * * *